(12) United States Patent
Peck

(10) Patent No.: US 7,152,495 B2
(45) Date of Patent: Dec. 26, 2006

(54) SYSTEM AND METHOD FOR ADAPTIVE CANCELLATION OF DISTURBANCES

(75) Inventor: Mason A. Peck, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 784 days.

(21) Appl. No.: 10/325,236

(22) Filed: Dec. 19, 2002

(65) Prior Publication Data

US 2004/0118231 A1   Jun. 24, 2004

(51) Int. Cl.
*G01C 19/30* (2006.01)
*G01C 19/06* (2006.01)
*F03G 3/00* (2006.01)
*B64G 1/28* (2006.01)
*G64C 17/06* (2006.01)

(52) U.S. Cl. .................... 74/5.47; 74/5.37; 74/84 S; 244/165; 244/79

(58) Field of Classification Search ................ 74/5.22, 74/5.34, 5.37, 5.4, 5.42, 5.47, 5.9, 84 R, 74/84 S; 244/165, 79

See application file for complete search history.

(56) References Cited

U.S. PATENT DOCUMENTS

| | | | |
|---|---|---|---|
| 3,071,012 A * | 1/1963 | Baring-Gould | 74/5.34 |
| 3,071,977 A * | 1/1963 | Ten et al. | 74/5.34 |
| 3,653,269 A * | 4/1972 | Foster | 74/84 S |
| 4,258,579 A * | 3/1981 | Olbrechts | 74/5.37 |
| 4,269,073 A * | 5/1981 | McIntyre | 74/5.7 |
| 4,354,393 A * | 10/1982 | Acker et al. | 74/5.37 |
| 4,399,714 A * | 8/1983 | Barker | 74/5.1 |
| 4,472,978 A * | 9/1984 | Levine et al. | 74/5.34 |
| 4,735,382 A * | 4/1988 | Pinson | 244/150 |
| 4,989,466 A * | 2/1991 | Goodman | 74/5.22 |
| 5,090,260 A * | 2/1992 | Delroy | 74/537 |
| 5,681,012 A | 10/1997 | Rosmann et al. | |
| 5,944,761 A | 8/1999 | Heiberg | |
| 6,305,647 B1 * | 10/2001 | Defendini et al. | 244/165 |
| 6,907,800 B1 * | 6/2005 | Inman | 74/5.4 |

OTHER PUBLICATIONS

Wie, B. et al. "New Approach to Attitude/Momentum Control for the Space Station," Journal of Guidance and Control and Dynamics, AIAA, NY, vol. 12, No. 5, Sep. 1, 1989, pp. 714-722: abstract, p. 714, col. #1, pgraph 1-col. #2, pgraph 1; fig 2; p. 717, col. #2, last pgraph-p. 718, col. # 2, pgraph 1.

* cited by examiner

*Primary Examiner*—Roger Pang
(74) *Attorney, Agent, or Firm*—Ingrassia Fisher & Lorenz

(57) ABSTRACT

A disturbance-cancellation system and method is provided that facilitates the adaptive cancellation of periodic disturbances. The disturbance-cancellation system and method includes a pair of control moment gyroscopes (CMGs) arranged together as a scissored pair. The scissored pair of CMGs is used to create a periodic torque with a controllable amplitude and frequency. The periodic torque created by the CMGs is adaptively controlled to cancel out periodic disturbances in the system. The system and method creates a periodic torque with a controllable amplitude and frequency by rotating the inner-gimbal assemblies of the CMGs in opposite directions at substantially equal phase and angular velocity. Amplitude matching can be achieved by adjusting the rotor spin rate. The steady-state constant motion results in a periodic torque along the output axis of the scissored pair, while components of torque along axes orthogonal to this one cancel out.

19 Claims, 4 Drawing Sheets

SYSTEM AND METHOD FOR ADAPTIVE CANCELLATION OF DISTURBANCES

FIELD OF THE INVENTION

This invention generally relates to torque disturbances and more specifically applies to cancellation of periodic torque disturbances.

BACKGROUND OF THE INVENTION

Many advanced systems are sensitive to vibrations and other disturbances. Excessive disturbances can introduce errors into the system and shorten the lifespan of systems. In some cases, the vibrations and other disturbances are periodic in nature. Disturbances are periodic when they follow a pattern that repeats over time. Periodic disturbances can have many causes. For example, many mechanical systems can produce periodic disturbances. One specific example, a rotating shaft, commonly found in many different mechanical systems, can create a transverse torque disturbance at harmonics of the shaft's rotational frequency. These periodic disturbances created by the mechanical system can negatively effect the operation of the overall systems.

Vibrations and other disturbances are particularly problematic in space systems, such as satellites. Vibrations in satellites can introduce a variety of errors and dramatically reduce the accuracy of the satellite. Many satellites include mechanical elements that create periodic disturbances. For example, some satellites include antennas, solar arrays or other bodies that rotate and can create a periodic disturbance. Some satellites include pumps, such as the ones in cryocoolers, which can create periodic disturbances.

In many satellites the vibrations caused by these mechanical systems can be unacceptable. For example, satellites that are required to accurately orient themselves at a precise attitude or point a payload precisely are particularly vulnerable to vibrations and other disturbances that introduce jitter.

Several different approaches have been used to reduce the effects of vibrations and other disturbances. These approaches include the use of passive devices, such as tuned-mass dampers and vibration isolators. Additionally, some active devices have been employed, such as electromechanically actuated struts, to attenuate or cancel these disturbances. Unfortunately, these past solutions have had several limitations. For example, passive devices typically eliminate only part of the disturbance. Past active devices, while generally being more effective have also generally had excessive power consumption and excessive weight, and have been computationally demanding.

Thus, what is needed is an improved system and method that reduces the impacts of periodic disturbances with out requiring excessive weight, computation and power consumption.

BRIEF SUMMARY OF THE INVENTION

The present invention provides a disturbance-cancellation system and method that provides for the adaptive cancellation of periodic disturbances. The disturbance-cancellation system and method includes a pair of control moment gyroscopes (CMGs) arranged together as a scissored pair. The scissored pair of CMGs is used to create a periodic torque with a controllable amplitude and frequency. The periodic torque created by the CMGs is adaptively controlled to cancel out periodic disturbances in the system.

The system and method creates a periodic torque with a controllable amplitude and frequency by rotating the inner-gimbal assemblies of the CMGs in opposite directions at substantially equal phase and angular velocity. This constant motion results in a periodic torque along the output axis of the scissored pair, while components of torque along axes orthogonal to this one cancel out.

The disturbance-cancellation system and method thus provide the ability to cancel relatively large-amplitude periodic disturbances while requiring relatively low weight and power consumption. This makes the disturbance-cancellation system and method ideally suited for use on satellite systems that require low disturbances for effective operation.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a disturbance-cancellation system and method that provides for the adaptive cancellation of periodic disturbances. The disturbance-cancellation system and method includes a pair of control moment gyroscopes (CMGs) arranged together as a scissored pair. The scissored pair of CMGs is used to create a periodic torque with a controllable amplitude and frequency. The periodic torque created by the CMGs is adaptively controlled to cancel out periodic disturbances in the system.

The system and method creates a periodic torque with a controllable amplitude and frequency by rotating the inner-gimbal assemblies of the CMGs in opposite directions at substantially equal phase and angular velocity. This constant motion results in a periodic torque along the output axis of the scissored pair, while components of torque along axes orthogonal to this one cancel out. The angular velocity of the scissored pair controls the frequency of the output torque used for cancellation. The speed of the rotors each CMG control the amplitude. The steady-state operation of a scissored pair (i.e., constant gimbal rate and rotor speed) provides the type of output that is required for canceling periodic disturbances. Additionally, the output characteristics of a steady-state scissored pair makes the solution is computationally simple to implement. Furthermore, CMGs are known to be extremely weight- and power efficient torque actuators because the gyroscopic effect greatly multiplies the relatively little effort required to move the gimbal axis, resulting in high torque for low power.

CMGs are known as efficient, low-power torque actuators. Because the gimbal axis is moving slowly, the shaft power is much lower than, for example, a reaction wheel that must achieve a comparable torque while spinning at thousands of RPM. By tilting the spinning rotor about the gimbal axis, a CMG offers large momentum transfer (i.e. torque) for only the power required to rotate the non-spinning gimbal and rotor assembly and the power needed to keep the rotor spinning.

The disturbance-cancellation system and method thus provides the ability to cancel relatively large amplitude periodic disturbances while requiring relatively low weight and power consumption. This makes the disturbance-cancellation system and method ideally suited for use on satellite systems that require low disturbances for effective operation.

Figure 1:
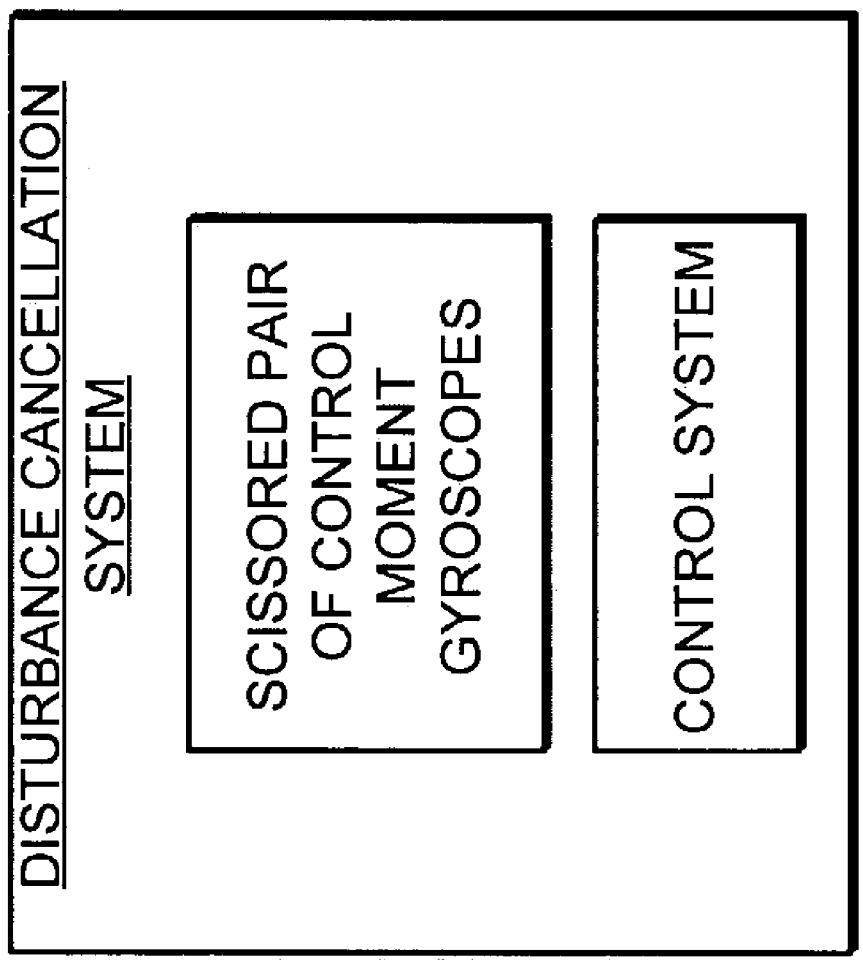
FIG. 1 is a schematic view of a disturbance-cancellation system.

Turning now to FIG. 1, a schematic view of a disturbance-cancellation system is illustrated. The disturbance-cancellation system includes a scissored pair of control moment gyroscopes (CMGs) and a control system. Each CMG in the scissored pair comprises an inner-gimbal assembly that includes a rotor. The CMGs are in configured in a scissored pair, i.e., their inner-gimbal assemblies rotate in opposite directions and at substantially equal gimbal rates and phase. The scissored pair of control moment gyroscopes is used to create a periodic torque with a controllable amplitude and frequency. The control system adaptively controls the scissored pair to create the periodic torque in a way that cancels disturbances in the system.

In particular, the control system receives as an input a measurement of the periodic disturbances in the system. In response, the control system adaptively controls the amplitude and frequency of the periodic torque generated by the CMGs. Specifically, the control systems drives the scissored pair of CMGs to produce a periodic torque having a frequency and amplitude equal to that that the torque disturbances in the system, but with an opposite phase. The control system accomplishes this by driving the gimbal rate to match the disturbance frequency. The control system also drives the rotor' spin rate to create a torque amplitude that matches the amplitude of the disturbances. Specifically, the rotor spin rate is controlled to a speed, which, when multiplied by the gimbal rate necessary to achieve the desired torque frequency, yields the desired amplitude. Thus, the control system controls the scissored pair of CMGs to create an adaptive cancellation of the torque disturbances in the system.

It should be noted that in some applications it will be desirable to include multiple scissored pairs of CMGs to reduce multiple periodic disturbances. This can be desirable when the vehicle is subjected to periodic disturbances with different frequencies, and/or in different directions.

Figure 2:
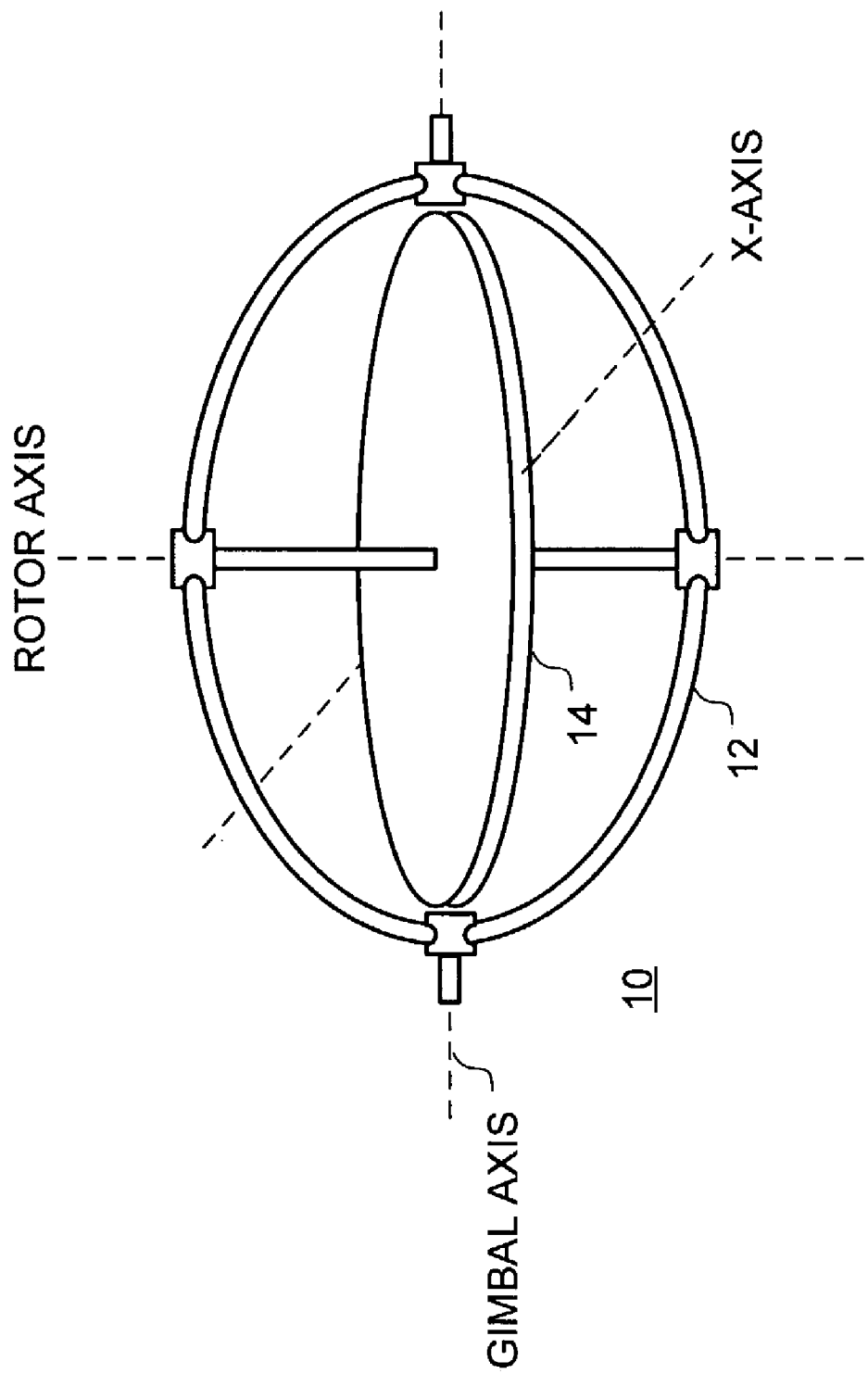
FIG. 2 is a simplified diagram of an exemplary control moment gyroscope.

Turning now to FIG. 2, a simplified diagram of an exemplary control moment gyroscope 10 is illustrated. The control moment gyroscope 10 is a simplified example of CMGs commonly used to provide attitude control for a vehicle such as a spacecraft. The simplified control moment gyroscope 10 includes a rotor 14 that spins around a rotor axis. The rotor 14 spins in an inner-gimbal assembly that includes the gimbal 12 and can be rotated around a gimbal axis 18. When a rotational torque is provided on the gimbal 12, the gimbal assembly rotates and a torque is generated in the x-axis, normal to the rotor axis and gimbal axis. This torque is transferred to the vehicle through the support structure of the gyroscope 10. This torque, in combination with torques from other gyroscopes, can be used to provide attitude control for the vehicle. Again, FIG. 2 is a simplified diagram and does not illustrate many features, such as the motors used to rotate the rotor 14 around the rotor axis, or the motors used to rotate the inner-gimbal assembly about the gimbal axis. Also not shown are the sensor modules used to sense the rotational position of the inner-gimbal assembly about the gimbal axis to provide for control of rotation.

Figure 3:
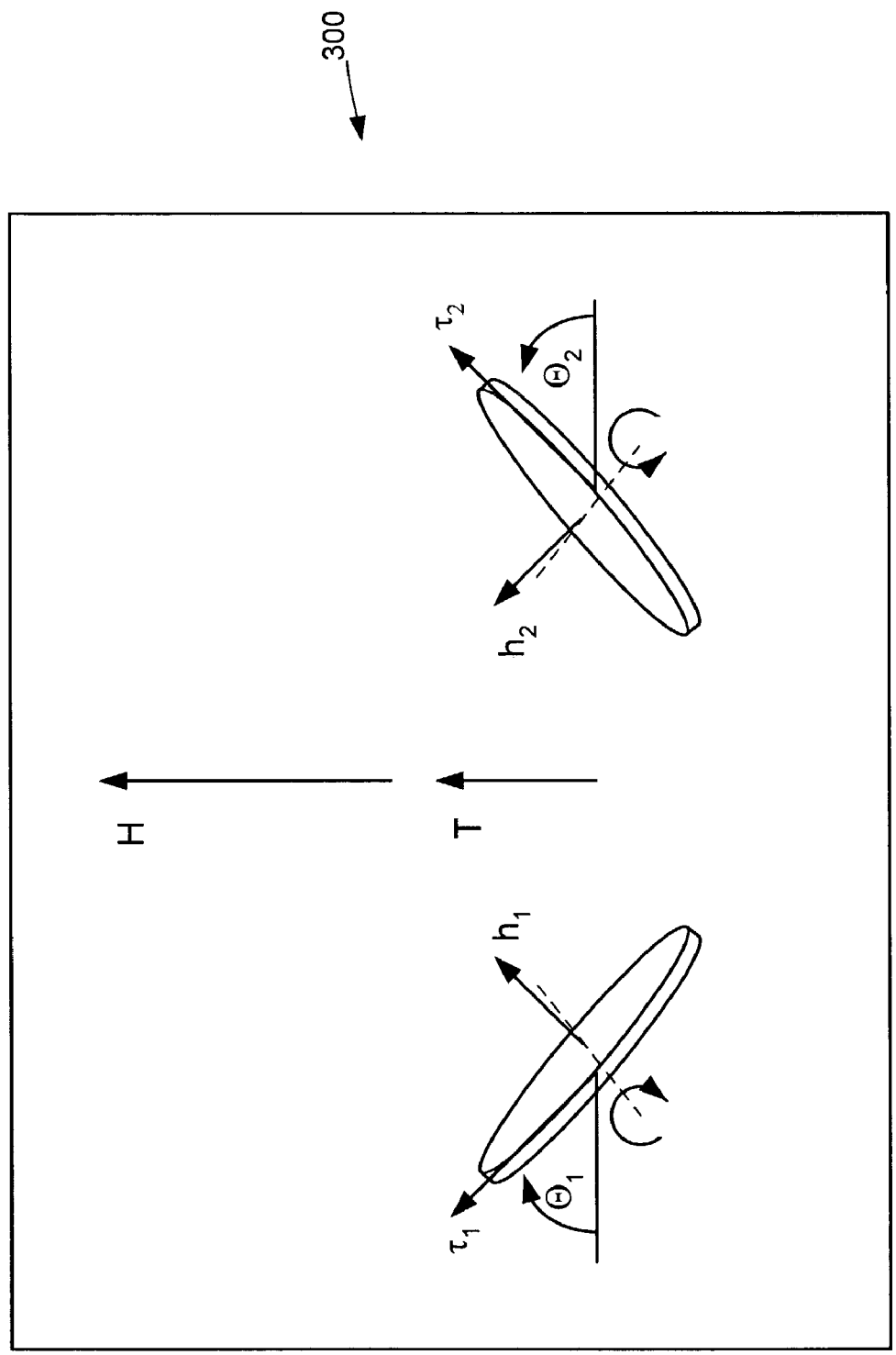
FIG. 3 is a schematic view of a scissored pair of CMGs.

Turning now to FIG. 3, a schematic view of a scissored pair of CMGs 300 is illustrated. For simplicity sake, only the rotors of the CMGs 300 are illustrated. Not shown are the remaining portions of the inner-gimbal assemblies, motors, housings and sensor elements. The scissored pair of CMGs 300 includes two CMGs with inner-gimbal assemblies that rotate in opposite directions at substantially equal phase and angular velocity. The equal and opposite rotation of inner-gimbal assemblies in the scissored pair results in a periodic torque along the output axis of the scissored pair, while components of torque along axes orthogonal to this one cancel out.

Specifically, as the inner-gimbal assemblies of the scissored pair of CMGs rotate, they output a sinusoidal torque whose magnitude is proportional to the gimbal rate and the stored angular momentum. The angular momentum H created by the scissored pair of gyroscopes can be expressed as:

$$H = 2h \cos(\Theta) \qquad \text{Equation 1}$$

Where h is the magnitude of the angular momentum produced by each of the rotors in the inner-gimbal assemblies and, because they must be equal for the scissored pair to output torque along a single axis, can be expressed as:

$$h = \|h_1\| = \|h_2\| \qquad \text{Equation 2}$$

The magnitude of the angular momentums $h_1$ and $h_2$ in the scissored pair are made equal by matching the angular momentum in the two rotors. The rotor inertias and spin rates may differ, as long as the produce of the inertia and rate for one rotor equals that of the other, i.e., $H = I\omega$, where I is the rotor inertia and $\omega$ is the spin rate. The resulting torque T created by the scissored pair of gyroscopes as the inner-gimbal assemblies rotate can be expressed as:

$$T = 2\omega h \sin(\Theta) \qquad \text{Equation 3}$$

Where $\omega$ is the angular velocity of the inner-gimbal assemblies, commonly referred to as the gimbal rate, and can be expressed as:

$$\omega = d\Theta/dt \qquad \text{Equation 4}$$

Where $\Theta$ is the rotor angle at a given time and is expressed as:

$$\Theta = \Theta_1 = \Theta_2 \qquad \text{Equation 5}$$

The angular momentum H and torque T generated by the scissored pair of CMGs thus comprises a sinusoidal momentum and torque aligned along the output axis of the scissored pair. This sinusoidal torque is used by the disturbance-cancellation system to cancel the effects of periodic disturbances on the system.

The CMGs used to implement the scissored pair can be any suitable CMG design and structure. Examples of suitable CMGs that can be used include any of those available from Honeywell International, Inc., such as the M50. Much smaller CMGs may also be appropriate, depending upon the demands of the application. Of course, any other suitable CMG design and structure that can be used in a scissored pair to impart a periodic torque to a vehicle could also be implemented as an embodiment of the current invention. It should also be noted that many different designs and structures could be used to couple the two CMGs together to provide the scissored pair operation. For example, the CMGs can be coupled together using matched toothed rings which contain the rotors, one rolling on the other. Similarly, the rotors might be placed side by side and a torque motor assembly geared so that it gimbals two rotors in opposite directions. Gears, belts, friction drives, virtually any sort of suspension may be used as long as the rotors are driven in opposite directions at equal speeds.

Returning to FIG. 1, the control system adaptively controls the scissored pair to create the periodic torque in a way that cancels disturbances in the system. In particular, the control system receives as an input a measurement of the periodic disturbances in the system. In response, the control system adaptively controls the amplitude and frequency of the periodic torque generated by the scissored pair of CMGs. Specifically, the control systems drives the scissored pair of CMGs to produce a periodic torque having a frequency and amplitude equal to that that the torque disturbances in the system, but with an opposite phase. The control system accomplishes this by driving the gimbal rate ($\omega$) is to match the disturbance frequency. The control system also drives the rotor's spin rate to create a torque amplitude that matches the amplitude of the disturbances. Thus, the control system controls the scissored pair of CMGs to create an adaptive cancellation of the torque disturbances in the system.

In one embodiment, the control system utilizes a phase-locked loop (PLL) type device to adaptively control the operation of the CMGs. In this embodiment, the PLL receives as an input a measurement of the periodic disturbances in the system. In response, the PLL adaptively controls the amplitude and frequency of the periodic torque generated by the CMGs. Specifically, the feedback operation of the PLL drives the drives the scissored pair of CMGs to produce a periodic torque having a frequency and amplitude equal to that that the torque disturbances in the system, but with an opposite phase. This feedback results in adaptive cancellation of the torque disturbances in the system.

Figure 4:
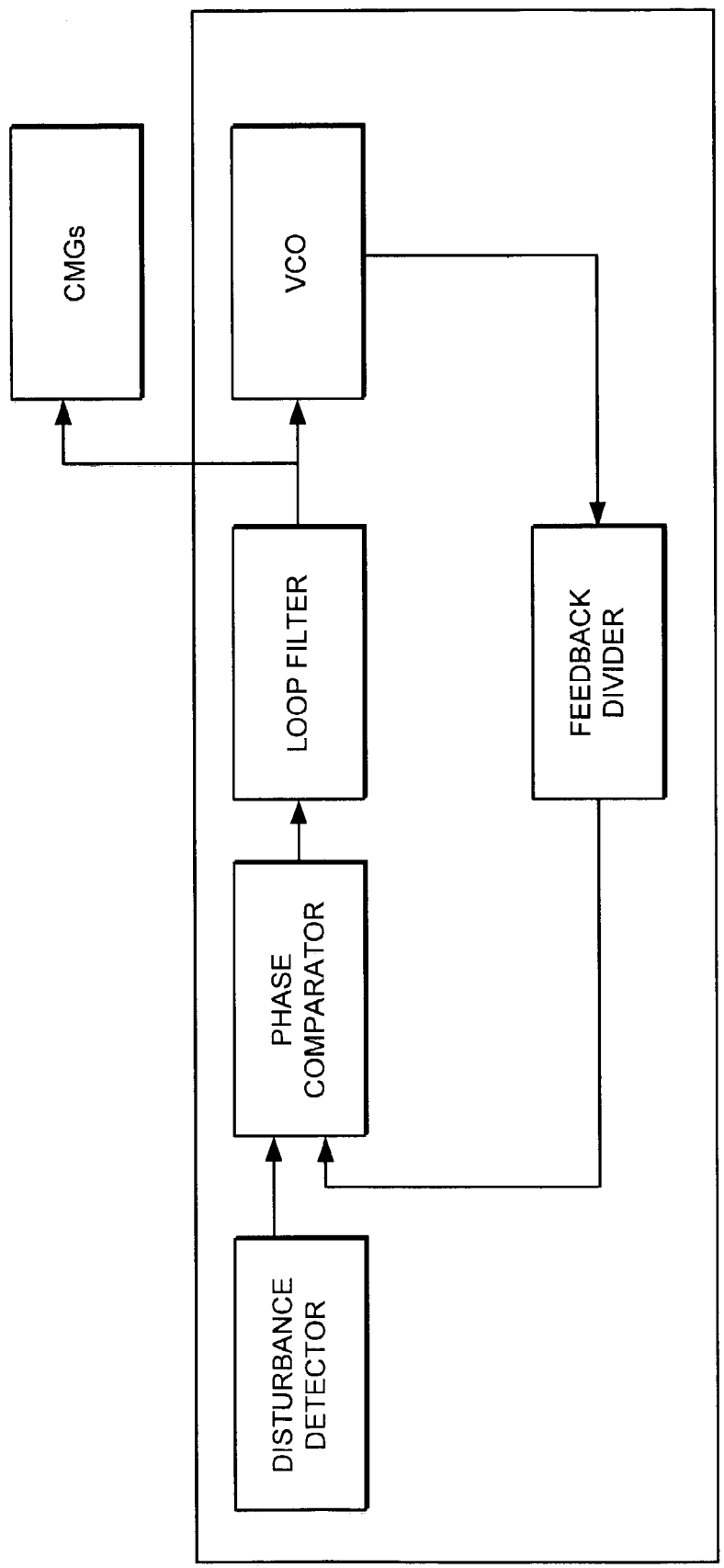
FIG. 4 is a schematic view of an exemplary phase-locked loop control system.

Turning now to FIG. 4, an exemplary phase-locked loop control system 400 is illustrated. The PLL control system 400 includes a disturbance detector, a phase comparator, a loop filter, a VCO and a feedback divider. The PLL control system 400 controls the operational gimbal rate of the scissored pair of CMGs. In general, the PLL operates by using feedback to drive the VCO to a frequency that results in phase lock between output of the VCO and the input signal. In the example illustrated in FIG. 4, the same signal used to drive the VCO is used to drive the scissored pair of CMGs. Thus, the CMGs can be driven to the same frequency and phase and as the measured disturbances.

The disturbance detector measures disturbances in the system and provides an output signal proportional to the measured disturbances. Many different types of devices could be used to measure disturbances and provide an appropriate output signal. For example, devices such as accelerometers, strain gauges, and rate-sensing gyros (fiber optic, ring-laser, or mechanical) can all be used.

The output of the disturbance detector is provided to the phase comparator. The phase comparator compares this signal to a feedback signal from the feedback divider. Depending upon the phase difference between the disturbance detector signal and the feedback signal, the phase comparator provides an output signal that is passed to the loop filter. The loop filter filters the phase comparator output and passes an output to the voltage controlled oscillator. The VCO receives the signal and outputs a signal with a frequency proportional to that signal. The output of the VCO is fed back through the feedback divider to the phase comparator. The feedback divider divides down the output signal frequency to match the input signal frequency so they can be phase compared. Thus, the signal path through the feedback divider to the phase comparator creates the feedback that facilitates the phase-locked loop operation.

Thus, the PLL operates by comparing the input signal phase to the feedback signal phase and eliminating any phase difference between the two by adjusting the oscillating frequency of the VCO. In the current embodiment, the same signal used to drive the VCO is used to drive the gimbal rate of the CMGs. Thus, the CMGs are driven to provide a sinusoidal torque output having the same frequency and phase as the disturbance detected by the disturbance detector. The magnitude of the error is computed through an amplitude loop and is used to drive the CMG rotor to spin directly.

The PLL control system 400 thus adaptively controls the scissored pair of CMGs to create the periodic torque in a way that cancels periodic disturbances in the system. Phase-locked loops are a very common, well understood technology. They can be realized digitally, or with analog components, making them inexpensive and versatile. Of course, the PLL is only one example of the type of control systems that can be used to adaptively control the CMGs. Other examples include traditional means of linear and nonlinear adaptive control, such as the extended Kalman filter, and online parameter-identification methods, such as recursive least-squares estimation. These methods demand fairly sophisticated and robust processing, which may be undesirable in low cost, low weight and high reliability applications, particularly in those applications where traditional IC's are vulnerable to radiation.

The present invention thus provides a disturbance-cancellation system and method that provides for the adaptive cancellation of periodic disturbances. The disturbance-cancellation system and method includes a pair of control moment gyroscopes (CMGs) arranged together as a scissored pair. The scissored pair of CMGs is used to create a sinusoidal torque with a controllable amplitude and frequency. The periodic torque created by the CMGs is adaptively controlled to cancel out sinusoidal in the system. The system and method creates this periodic torque with a controllable amplitude and frequency by rotating the inner-gimbal assemblies of the CMGs in opposite directions at substantially equal phase and angular velocity and controllable amplitude by adjusting rotor speed. This constant motion results in a periodic torque along the output axis of the scissored pair, while components of torque along axes orthogonal to this one cancel out.

The disturbance-cancellation system and method thus provides the ability to cancel relatively large amplitude periodic disturbances while requiring relatively low weight and power consumption. This makes the disturbance-cancellation system and method ideally suited for use on satellite systems that require low disturbances for effective operation.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A disturbance-cancellation system, the disturbance-cancellation system comprising:
   a) a pair of control moment gyroscopes adapted to operate as a scissored pair, the scissored pair of control moment gyroscopes each comprising an inner-gimbal assembly that includes a rotor, the scissored pair of control moment gyroscopes configured rotate the inner-gimbal assemblies in opposite directions and at substantially equal gimbal rates; and
   b) a control system coupled to the control the pair of control moment gyroscopes, the control system measuring a periodic disturbance and selecting a rotational frequency of the pair of control moment gyroscopes to create a periodic torque to substantially cancel the periodic disturbance.

2. The disturbance-cancellation system of claim 1 wherein the rotational frequency comprises the gimbal rate of the inner-gimbal assemblies.

3. The disturbance-cancellation system of claim 1 wherein the control system comprises a phase-locked loop.

4. The disturbance-cancellation system of claim 3 wherein the phase-locked loop drives the pair of control moment gyroscopes to have a rotational frequency substantially equal to a frequency of the measured periodic disturbance.

5. The disturbance-cancellation system of claim 3 wherein the phase-locked loop drives the pair of control moment gyroscopes to have a rotational frequency substantially equal to a frequency of the measured periodic disturbance and to output the periodic torque having substantially equal frequency and substantially opposite phase to the measured periodic disturbance.

6. The disturbance-cancellation system of claim 1 wherein the control system includes a disturbance detector to measure the periodic disturbance.

7. The disturbance-cancellation system of claim 1 wherein the disturbance detector comprises an accelerometer.

8. The disturbance-cancellation system of claim 1 further comprising:
   i) a second pair of control moment gyroscopes adapted to operate as a second scissored pair; and
   ii) a second control system coupled to the control the second pair of control moment gyroscopes, the second control system measuring a second periodic disturbance and selecting a rotational frequency of the second pair of control moment gyroscopes to create a second periodic torque to substantially cancel the second periodic disturbance.

9. A disturbance cancellation system, the disturbance cancellation system comprising:
   a) a scissored pair of control moment gyroscopes, the scissored pair of control moment gyroscopes each comprising an inner-gimbal assembly that includes a rotor, the scissored pair of control moment gyroscopes configured rotate the inner-gimbal assemblies in opposite directions and at substantially equal gimbal rates;
   b) a control system coupled to the control the gimbal rates of the scissored pair of control moment gyroscopes, the control system measuring a periodic disturbance and driving the gimbal rates of the scissored pair of control moment gyroscopes to rotate at substantially equal a frequency of the measured periodic disturbance such that a periodic torque is created to substantially cancel the periodic disturbance.

10. The disturbance-cancellation system of claim 9 wherein the control system comprises a phase-locked loop.

11. The disturbance-cancellation system of claim 10 wherein the phase-locked loop includes a phase comparator and loop filter, the phase comparator receiving an input signal proportional to the periodic disturbance and comparing the input signal to a feedback signal and outputting a signal to the loop filter.

12. The disturbance-cancellation system of claim 11 wherein an output of the loop filter is coupled to control the gimbal rates of the scissored pair of control moment gyroscopes.

13. The disturbance-cancellation system of claim 9 wherein the control system includes a disturbance detector to measure the periodic disturbance.

14. The disturbance-cancellation system of claim 9 wherein the control system further controls rotor rotation speed for each rotor in the scissored pair of control moment gyroscopes to control amplitude of the periodic torque that is created.

15. The disturbance-cancellation system of claim 9 further comprising:
   a) a second scissored pair of control moment gyroscopes, the second scissored pair of control moment gyroscopes each comprising an inner-gimbal assembly that includes a rotor, the second scissored pair of control moment gyroscopes configured rotate the inner-gimbal assemblies in opposite directions and at substantially equal gimbal rates;
   b) a second control system coupled to the control the gimbal rates of the second scissored pair of control moment gyroscopes, the control system measuring a second periodic disturbance and driving the gimbal rates of the second scissored pair of control moment gyroscopes to rotate at substantially equal a frequency of the measured second periodic disturbance such that a second periodic torque is created to substantially cancel the second periodic disturbance.

16. A method of cancelling disturbances in a system, the method comprising the steps of:
   a) providing a pair of control moment gyroscopes adapted to operate as a scissored pair, wherein the pair of control moment gyroscopes each include an inner-gimbal assembly, and wherein the scissored pair of control moment gyroscopes is configured rotate the inner-gimbal assemblies in opposite directions and at substantially equal gimbal rates;
   b) measuring the frequency of a periodic disturbance; and
   c) selecting a rotational frequency for the pair of control moment gyroscopes to create a periodic torque to substantially cancel the periodic disturbance.

17. The method of claim 16 wherein the rotational frequency comprises the gimbal rate of the inner-gimbal assemblies.

18. The method of claim 16 wherein the step of selecting a rotation frequency of the pair of control moment gyroscopes comprises selecting a rotational frequency substantially equal to the frequency of the measured periodic disturbance.

19. The method of claim 16 wherein the step of measuring the rotational frequency for the pair of control moment gyroscopes comprises comparing the periodic torque to the measured periodic disturbance.

* * * * *